US006858255B2

(12) United States Patent
Deckers et al.

(10) Patent No.: US 6,858,255 B2
(45) Date of Patent: Feb. 22, 2005

(54) THICKENERS FOR PAPER DYE COMPOSITIONS

(75) Inventors: James A. Deckers, Plover, WI (US); Stephen S. Jose, Charlotte, NC (US); Michael T. Jennings, Appleton, WI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 10/734,978

(22) Filed: Dec. 15, 2003

(65) Prior Publication Data

US 2004/0123404 A1 Jul. 1, 2004

Related U.S. Application Data

(62) Division of application No. 09/898,317, filed on Jul. 3, 2001, now abandoned.

(51) Int. Cl.⁷ .............................................. B05D 1/38
(52) U.S. Cl. ..................... 427/333; 427/391; 427/411; 162/162; 8/919; 8/495
(58) Field of Search .................... 427/333, 391, 427/411; 8/495, 919, 553, 558, 561, 562; 162/162, 135

(56) References Cited

U.S. PATENT DOCUMENTS

| 4,024,071 | A | * | 5/1977 | Fringeli ................. 252/301.23 |
| 4,066,805 | A | | 1/1978 | Shenk |
| 4,224,421 | A | | 9/1980 | Streit et al. |
| 4,425,405 | A | | 1/1984 | Murakami et al. |
| 5,209,515 | A | | 5/1993 | Dotson et al. |
| 5,288,589 | A | | 2/1994 | McKeever et al. |
| 5,697,985 | A | | 12/1997 | Good et al. |
| 5,698,296 | A | | 12/1997 | Dotson et al. |
| 5,814,188 | A | * | 9/1998 | Vinson et al. ............... 162/109 |
| 5,824,190 | A | * | 10/1998 | Guerro et al. .............. 162/135 |
| 5,910,623 | A | * | 6/1999 | Kessel et al. .................. 8/402 |
| 5,972,167 | A | | 10/1999 | Hayasaka et al. |
| 6,258,771 | B1 | | 7/2001 | Hsu et al. |
| 6,319,360 | B1 | | 11/2001 | Small et al. |
| 6,335,395 | B1 | | 1/2002 | Sadasivan et al. |

OTHER PUBLICATIONS

Derwent Accession No. 1988–171092, English Abstract for JP63–108338, May 13, 1988.

\* cited by examiner

*Primary Examiner*—Margaret Elnsmann

(57) ABSTRACT

The present invention is a thickened dye composition and method of applying same to a paper web that produces colored or patterned paper having good bleed resistance. The dye composition of the invention includes a binder; a dye; a thickener selected from the group consising of polyvinylpyrrlidone homopolymers, polyvinylpyrrolidone copolymers, and mixtures thereof; and water. The present invention also includes colored or patterned papers prepared using this conposition.

15 Claims, No Drawings

THICKENERS FOR PAPER DYE COMPOSITIONS

CROSS-REFERENCE TO RELATED APPLICATIONS

The present application is a divisional application of 09/898,317, filed on Jul. 3, 2001, now abandoned, the disclosure of which is incorporated herein by reference.

FIELD OF THE INVENTION

The present invention relates to thickeners for paper dye compositions and particularly to the use of thickeners in dye compositions to increase the bleed resistance of colored or patterned paper.

BACKGROUND OF THE INVENTION

Paper is typically made by feeding a uniform continuous stream of a dilute water suspension of cellulose fibers to a forming section. The forming section can include a Fourdrinier type wire machine, a twin-wire machine, or any other machine where moisture is removed from the paper pulp through wire mesh screens to produce paper stock material. The removal of moisture is typically facilitated through the use of rolls and suction boxes that support the wire screens. Upon leaving the forming section, the paper stock material typically includes about 20% solids.

The paper stock material is then transferred to the press section where it is placed onto a continuous felt. A series of press rolls are used to further remove moisture from the paper stock material through the felt by mechanical pressure. The resulting paper web is then fed to a first set of dryers to produce paper having 80–95% fiber content. The coated paper then passes through a size press where sizing agents are applied to decrease the moisture absorbency of the paper. The paper web can then be passed through two transfer rolls or through a similar device in a coating station where "coating color" is applied. Coating color typically includes fillers or pigments (e.g. calcium carbonate), binders, and the like and is typically used to impart certain properties such as whiteness, density or glossiness to the paper. The paper web is then passed to a second set of dryers and then collected, for example, on rolls.

It is often desirable to add a dye during the papermaking process to produce colored paper or patterned paper. Colored paper and patterned paper are commonly used to provide paper products having an enhanced aesthetic appearance. Colored paper is dyed evenly over its whole surface to produce a paper having a uniform color. Patterned paper is paper that has been dyed non-uniformly rather than evenly over its whole surface.

The typical method of producing dyed papers such as colored or patterned papers is to apply a dye, generally in an aqueous composition, either to the surface of the paper web during the papermaking process or to the surface of the paper after it has dried. For example, the dye can be applied by spraying the paper web with a dye composition after it has been coated and dried. Alternatively, the dye composition can be applied before the paper web has been fully dried through the use of rod, blade or roll coating methods.

Although conventional papermaking processes allow for the production of a variety of colored and patterned papers, there is a need to improve these processes. In particular, one problem with colored and patterned papers it that the colors have a tendency to bleed. As a result, the appearance of the colored or patterned paper can be adversely affected. Therefore, there is a need to produce colored or patterned papers that have good bleed resistance and thus maintain their dyed appearance.

SUMMARY OF THE INVENTION

The present invention is a thickened dye composition and method of making and applying same to a paper web that produces colored or patterned paper having good bleed resistance. In particular, the dye composition of the invention includes a binder, a dye; a thickener selected from the group consisting of polyvinylpyrrolidone homopolymers, polyvinylpyrrolidone copolymers, or mixtures thereof; and water. The dye composition preferably has a viscosity of from about 30 to about 2000 cps. The binder includes starches, acrylic ester/styrene copolymers, acrylic ester/acrylonitrile copolymers, carboxylated styrene/butadiene copolymers, polyvinyl alcohol, polyvinyl acetate, casein, soybean protein, carboxymethylcellulose (CMC), hydroxyethylmethyl cellulose (HEMC), polyesters, polyethers, alkyd resins, and mixtures thereof, and is more preferably a starch and/or an acrylic ester/styrene copolymer. Furthermore, the dye composition can include a crosslinker such as blocked and straight or unblocked glyoxal-based insolubilizers, aliphatic epoxy resins, ammonium zirconium carbonate (AZC), potassium zirconium carbonate (KZC), melamine, melamine formaldehyde, blocked isocyanates, and mixtures thereof The dyes used in the dye composition include basic dyes, acid dyes, anionic direct dyes, cationic direct dyes, anionic pigment dispersions, and cationic pigment dispersions. The dye composition can further include a filler such as silica, silica gel, calcium carbonate, calcium sulfite, pyrophilite, kaolin, clay, titanium oxide, aluminum hydroxide, aluminum trihydrate, satine white, barium sulfate, magnesium oxide, talc, colloidal silica, plastic pigments, and white urea resin pigments. In a preferred embodiment, the dye composition includes on a dry weight basis a binder in an amount from greater than 0 to about 65% by weight, a dye in an amount from greater than 0 to about 35% by weight, a thickener in an amount from greater than 0 to about 25% by weight, a filler in an amount from 0 to about 25% by weight, and a crosslinker in an amount from 0 to about 25% by weight.

The present invention further includes a method of dyeing a paper web, comprising the step of applying the dye composition discussed above to a paper web. The dye composition can be added during wet end addition points prior to complete drying of the paper web such as at the sizing press. Moreover, the dye composition can be applied once the paper has been fully dried by spraying the dried paper with the dye composition. The dye composition is typically applied after a dye fixing agent has been applied. Preferably, a dye fixing agent formed of a polyethyleneimines, polyethyleneimine derivatives, sodium chloride, magnesium chloride, potassium chloride, alum, diallyl dimethyl ammonium chloride (DADMAC) and polymers thereof, optical brightening agents (OBA's), silicas, and mixtures thereof, and more preferably formed of polyethyleneimines or polyethyleneimine derivatives, is applied to the paper web prior to application of the dye composition. The dye composition is typically prepared by mixing a binder solution or dispersion; a dye powder, solution or dispersion; a thickener powder, solution or dispersion; and water.

The colored and patterned papers formed in accordance with the invention are formed of a sheet of cellulose fibers, wherein the sheet is coated with a dye fixing agent, a binder, a dye, and a thickener selected from the group consisting of polyvinylpyrrolidone homopolymers, polyvinylpyrrolidone copolymers, and mixtures thereof. Preferably, the dye-fixing agent is polyethyleneimine or a polyethyleneimine derivative.

These and other features and advantages of the present invention will become more readily apparent to those skilled in the art upon consideration of the following detailed description, which describe both the preferred and alternative embodiments of the present invention.

DETAILED DESCRIPTION OF THE PREFERRED EMBODIMENTS

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The present invention is a dye composition for dyeing a paper web, comprising a binder, a dye, a thickener, and water. The binder used in the dye composition is preferably selected from the group consisting of starches, acrylic ester/styrene copolymers, acrylic ester/acrylonitrile copolymers, carboxylated styrene/butadiene copolymers, polyvinyl alcohol, polyvinyl acetate, casein, soybean protein, carboxymethylcellulose (CMC), hydroxyethylmethyl cellulose (HEMC), polyesters, polyethers, alkyd resins, and mixtures thereof. The copolymer binders can also include monomer units other than those mentioned, e.g., the acrylic ester/styrene copolymers can also include monomers such as acrylonitrile. More preferably, particularly for paper applications, the binder includes a starch and/or an acrylic ester/styrene copolymer. Suitable starches include unmodified and modified starches. Suitable acrylic ester/styrene copolymers include ACRONAL® S 504 polymer dispersion and ACRONAL® S 728 polymer dispersion, both of which are commercially available from BASF Corporation. Preferably, the binder is added to the composition in the form of aqueous dispersion or solution. The binder is typically selected to correspond to the dye such that the charge of the dye and the charge of the binder are not opposite one another (e.g. an anionic or non-ionic binder is matched with an anionic direct dye). The binder is typically present in the dye composition in an amount from greater than 0 to about 70 percent by weight, more preferably from about 15 to about 60 percent by weight, based on the total dry weight of the composition.

In addition to the binder, the dye composition can optionally include a crosslinker to crosslink the binder molecules. The crosslinker typically increases the coating density and the water repellency of the dye composition. Suitable crosslinkers include blocked and straight or unblocked glyoxal-based insolubilizers, aliphatic epoxy resins, ammonium zirconium carbonate (AZC), potassium zirconium carbonate (KZC), melamine, melamine formaldehyde, blocked isocyanates, and mixtures thereof. Preferably, the crosslinker is a blocked glyoxal-based insolubilizer such as CURESAN® 199 resin or CURESAN® 200 resin, both of which are commercially available from BASF Corporation. The crosslinker is typically added as an aqueous dispersion and can be present in the dye composition in an amount from 0 to about 25 percent by weight, more preferably from about 1 to about 20 percent by weight, based on the total dry weight of the composition.

The dye used in the composition includes at least one dye selected from the group consisting of basic dyes, acid dyes, anionic direct dyes, cationic direct dyes, anionic pigment dispersions, and cationic pigment dispersions. Preferably, the dye used in the composition is an anionic direct dye or a cationic direct dye. Suitable anionic direct dyes and cationic direct dyes are commercially available from BASF Corporation as FASTUSOL® dyes and FASTUSOL® C dyes, respectively. In addition, suitable basic dyes (e.g. BASAZOL® dyes), acid dyes (e.g. ANTHOSIN® dyes) and anionic pigment dispersions (e.g. SOLAR® pigment dispersions) are also commercially available from BASF Corporation. Certain colorant auxiliaries such as cleaning agents can also be used in the dye composition. The dye is generally added to the dye composition as an aqueous solution or dispersion, but can also be added in solid form. The dye is typically present in the dye composition in an amount from greater than 0 to about 35 percent by weight, more preferably from about 1 to about 25 percent by weight, based on the total dry weight of the composition.

In addition to the dyes, fillers can be added to impart certain properties to the colored or patterned paper such as smoothness, whiteness, increased density or weight, decreased porosity, increased opacity, flatness, glossiness, and the like. Suitable fillers include silicas (fumed or precipitated in powders or dispersions), silica gel, calcium carbonate (precipitated or ground), calcium sulfite, pyrophilite, kaolin, clay, titaniun oxide, aluminum hydroxide, aluminum trihydrate, satine white, barium sulfate, magnesium oxide, talc, colloidal silica, plastic pigments, white urea resin pigments, and the like. For example, silica can be added as a flattener. The fillers are typically added as powders to the dye composition. The fillers can be present in the dye composition in an amount from 0 to about 25 percent by weight, more preferably from about 2 to about 15 percent by weight, based on the total dry weight of the composition.

The thickener used in the dye composition of the invention is selected from the group consisting of polyvinylpyrrolidone (PVP) homopolymers, polyvinylpyrrolidone copolymers, and mixtures thereof. In accordance with the invention, it has been discovered that these thickeners are particularly suitable for use with dyes. Preferably, the thickener is a polyvinylpyrrolidone homopolymer such as LUVISKOL® K90 solution, commercially available from BASF Corporation. Suitable polyvinylpyrrolidone copolymers include poly(vinylpyrrolidone-vinyl acetate) (PVP/VA) copolymers. The polyvinylpyrrolidone copolymers can also be derived from other monomers other than vinyl acetate in addition to the vinylpyrrolidone monomers. The thickener is typically added to the dye composition as an aqueous dispersion or emulsion but can also be added as a solid powder. The thickener is typically present in the dye composition in an amount from greater than 0 to about 25 percent by weight, more preferably from about 5 to about 20 percent by weight, based on the total dry weight of the composition.

In addition to the thickeners listed above, the dye composition of the invention can include a small amount of at least one additional thickener. For example, the dye composition can include at least one acrylic acid/alkyl acrylate copolymer derived from monomers comprising at least one acid monomer selected from the group consisting of acrylic acid and methacrylic acid monomers and at least one acrylic ester monomer selected from the group consisting of alkyl acrylate and alkyl methacrylate monomers. Suitable acrylic acid alkyl acrylate copolymers include STEROCOLL® FD thickener and STEROCOLL® FS thickener, both of which are commercially available from BASF Corporation. Moreover, other thickeners can also be included in the dye composition such as guar gum, jaguar, carrageenan, xanthan, acetan, konjac mannan, xyloglucan, CMC, HEMC, urethanes and mixtures thereof. The additional thickener can be present in the dye composition in an amount from 0 to about 15 percent by weight, more preferably from 0 to about 5 percent by weight, based on the dry weight of the composition.

The dye composition of the invention can also include other additives such as anti-foaming agents, pH buffers, dispersants, preservatives or lubricants, and these additives are well known in the art. These additives can be present in the dye composition in an amount from 0 to about 20 percent by weight, more preferably from 0 to about 5 percent by weight, based on the dry weight of the composition.

The dye composition of the invention typically has a viscosity of from about 30 to about 2000 cps as measured using a Brookfield viscometer at a rotation of 100 rpm. In particular, the viscosity preferably has a viscosity of about 30 to about 200 cps for most wet applications in the paper making process and in off-machine coating processes but preferably has a viscosity of from about 1500 to about 2000 cps for table applications. The application methods are discussed below.

The present invention also includes a method of dyeing a paper web by applying the dye composition discussed above to a paper web. Typically, the paper web is produced using conventional forming, pressing and drying equipment. The paper web or furnish can include various ratios of softwood and hardwood as would be understood to those skilled in the art. For example, a blend of 25% softwood and 75% hardwood can be used. Various types of wood pulps can be used in accordance with the invention including bleached Kraft, unbleached Kraft, post-consumer, recycled fiber, secondary fiber, ground wood, sulfite, sulfate and semi-chemical pulps, and blends thereof.

A sizing agent and/or dye fixing agent is preferably applied to the paper web and dried onto the surface of the paper web prior to the application of the dye composition. Suitable sizing agents include acrylic copolymers sold under the BASOPLAST® mark from BASF Corporation. More preferably, a dye-fixing agent is applied to the paper web (with or without a sizing agent) and dried onto the surface of the paper web prior to the application of the dye composition. Suitable dye fixing agents include polyethyleneimes, polyethyleneimine derivatives, sodium chloride, magnesium chloride, potassium chloride, alum, diallyl dimethyl ammonium chloride (DADMAC) and polymers thereof, optical brightening agents (OBA's), silicas, and mixtures thereof. Preferably, the dye fixing agent is a polyethyleneimine or polyethyleneimine derivative such as the fixing agents sold commercially under the POLYMIN® PR 971L and CATIOFAST® NB-DF marks by BASF Corporation. The dye-fixing agent is typically applied in an amount of greater than 0 to about 20 lbs/ton dry weight, more preferably from about 2 to about 10 lbs/ton dry weight. It has been discovered that the application of dye fixing agents prior to the application of the thickened dye compositions of the invention increases the bleed resistance of the colored papers and patterned papers of the invention.

The dye composition can be added at wet application points prior to complete drying of the paper web. For example, the dye composition can be applied at the pulper, dump chest, machine chest, drop chest, blend chest, stuff box, refiner, head box (including the piping approaching the head box), fan pump, table (e.g. Fourdrinier, twin wire and modified Fourdrinier), white water silos, pits, press sections, main dryer section, size press, coater, small dryer section, calendar stack, and the like. Preferably, the dye composition is applied to the paper web after it has been dried to about 80–95% solids at the sizing press. The dye composition can alternatively be applied once the paper has been fully dried in an off-machine coating process such as by spraying the dried paper with the dye composition. For example, spraying can be accomplished through various types and sizes of nozzles. The nozzles can be stationary, moving or rotating to produce the dyed surface of the paper. After application of the dye composition, coating color can be applied in a coating station by conventional methods known in the art such as using transfer rolls.

The colored and patterned papers of the invention as mentioned above have excellent bleed resistance as desired in the art. These dyed papers are formed of a sheet of cellulose fibers, the sheet having coated thereon a binder, a dye and a thickener selected from the group consisting of polyvinylpyrrolidone homopolymers, polyvinylpyrrolidone copolymers, and mixtures thereof. In a preferred embodiment, the sheet of cellulose fibers is also coated with a dye fixing agent such as a polyethyleneimine-based composition as discussed above. In particular, the sheet is first coated with the dye fixing agent so that it is directly adjacent the sheet of cellulose fibers, and then coated with the binder, dye and thickener. Preferably, these coatings remain generally on the surface of the fiber sheet and do not significantly penetrate or impregnate the fiber sheet. Therefore, the dye fixing agent, binder, dye, and thickener are efficiently used to produce the colored or patterned surface on the fiber sheet.

The present invention will now be further described by the following non-limiting examples. It is noted that, in the examples, the bleed test was conducted by placing a sample of the colored paper between two blotters, soaking the blotters and colored paper in water, placing the blotters and colored paper between two PLEXIGLAS® sheets, letting the blotters and colored paper sit for 15 minutes, and then checking the blotters to determine the amount of dye that bled from the colored paper to the blotters.

EXAMPLE 1

A freesheet furnish comprising 25% softwood and 75% hardwood was coated with 5 lbs lbs/ton dry weight of POLYMIN® PR 971L dye fixing agent (a polyethyleneimine solution) by dipping the freesheet in the solution and then drying the freesheet leaving 5–20% moisture. A dye composition was prepared by first mixing 58.28 g of LUVISKOL® K90 solution (a 20% PVP solution) with 168.72 g of water to produce a dilute solution. 0.8 g of FASTUSOL® Red 51L dye (a red anionic direct dye) and 0.8 of fumed silica powder were added to the solution. 13 ml of the resulting solution was then mixed with 74 ml water, 2 ml of ACRONAL® S 504 binder, 1 ml of CURESAN® 200 resin, and 10 ml of a 10% starch solution, to form the dye composition. To simulate size press conditions, the coated freesheet was dipped in the dye composition for 15 seconds. The lower edge of the freesheet was then blotted and the freesheet was dried in a forced air oven at approximately 140° F. to produce colored paper. The resulting colored paper had only a trace amount of bleeding when subjected to the bleed test discussed above.

EXAMPLE 2

Three freesheet furnishes comprising 25% softwood and 75% hardwood were coated with 0 lbs/ton, 3 lbs/ton or 6 lbs/ton dry weight of POLYMIN® PR 971L dye fixing agent, respectively. 13 ml of the aqueous solution (containing dye, silica and PVP) described in Example 1 was mixed with 73 ml water, 3 ml of ACRONAL® S 728 binder, 1 ml of CURESAN® 200 resin, and 10 ml of a 10% starch solution, to form the dye composition. To simulate size press conditions, the coated freesheets were each dipped in the dye composition for 15 seconds. The lower edge of each of the freesheets was then blotted and the freesheets were dried in a forced air oven at approximately 140° to produce colored paper. The 0 lbs/ton paper web had significant color bleeding when subjected to the bleed test discussed above. The 3 lb/ton sample, on the other hand, had only a trace amount of color bleeding. Moreover, the 6 lb/ton sample had little or no color bleeding.

It is understood that upon reading the above description of the present invention, one skilled in the art could make changes and variations therefrom. These changes and variations are included in the spirit and scope of the following appended claims.

What is claimed is:

1. A method of dyeing a paper web comprising
   i) coating a paper web with a dye fixing agent, wherein the dye fixing agent comprises at least one of a polyethyleneimine and/or a polyethyleneimine derivative solution,
   ii) drying the paper web, and
   iii) applying a dye composition to the paper web,
   wherein the dye composition comprises
   a binder;
   a dye and/or pigment dispersion;
   a thickener comprising a poly(vinylpyrrolidone-vinyl acetate) copolymer; and water.

2. The method of claim 1, wherein the dye fixing agent further comprises at least one of sodium chloride, magnesium chloride, potassium chloride, alum, diallyl dimethyl ammonium chloride and polymers thereof, optical brightening agents, and/or silicas.

3. The method of claim 1, wherein the dye composition further comprises at least one additional thickener formed of an acrylic acid/alkyl acrylate copolymer.

4. The method of claim 1, wherein the binder is selected from the group consisting of starches, acrylic ester/styrene copolymers, acrylic ester/acrylonitrile copolymers, carboxylated styrene/butadiene copolymers, and mixtures thereof.

5. The method of claim 1, wherein the dye composition further comprises a crosslinker.

6. The method of claim 5, wherein the crosslinker is selected from the group consisting of blocked and straight or unblocked glyoxal-based insolubilizers, aliphatic epoxy resins, ammonium zirconium carbonate, potassium zirconium carbonate, melamine, melamine formaldehyde, blocked isocyanates, and mixtures thereof.

7. The method of claim 1, wherein the crosslinker is a blocked glyoxal-based insolubilizer.

8. The method of claim 1, wherein the dye is selected from the group consisting of basic dyes, acid dyes, anionic direct dyes, cationic direct dyes, and the pigment dispersion is selected from the group consisting of anionic pigment dispersions, and cationic pigment dispersions.

9. The method of claim 1, wherein the dye composition further comprises a filler.

10. The method of claim 9, wherein the filler is selected from the group consisting of silica, silica gel, calcium carbonate, calcium sulfite, pyrophilite, kaolin, clay, titanium dioxide, aluminum hydroxide, aluminum trihydrate, satin white, barium sulfate, magnesium oxide, talc, colloidal silica, plastic pigments, and white urea resin pigments.

11. The method of claim 1, wherein the applying step comprises applying the dye composition to the paper web in a sizing press.

12. The method of claim 1, wherein the applying step comprises spraying the dye composition onto the paper or paper web.

13. The method of claim 1 further comprising a step of preparing the dye composition by mixing the binder, the dye, the thickener, and water.

14. The method of claim 1 further comprising drying the paper web after the applying step.

15. The method of claim 1, wherein the entire surface of the paper web is coated with the dye composition.

* * * * *